United States Patent [19]

Aoki

[11] 4,228,816
[45] Oct. 21, 1980

[54] FIRE SAFE BUTTERFLY VALVE
[75] Inventor: Tadashi Aoki, Ohmiya, Japan
[73] Assignee: Jamesbury Corporation, Worcester, Mass.
[21] Appl. No.: 866,870
[22] Filed: Jan. 4, 1978
[51] Int. Cl.³ .................. F16K 5/06; F16K 17/40
[52] U.S. Cl. ........................... 137/72; 251/173; 251/174
[58] Field of Search ............... 137/72–77; 251/173, 174, 306, 307

[56] References Cited

U.S. PATENT DOCUMENTS

| 3,346,234 | 10/1967 | Allen | 251/174 |
| 3,480,253 | 11/1969 | Priese et al. | 251/315 X |
| 3,608,861 | 9/1971 | Helman et al. | 251/306 X |
| 4,105,040 | 8/1978 | Chester | 251/174 X |

FOREIGN PATENT DOCUMENTS 45-32861 10/1970 Japan ..................... 251/306
1000411 8/1965 United Kingdom ........... 251/174

Primary Examiner—Alan Cohan
Assistant Examiner—Richard Gerard
Attorney, Agent, or Firm—Oblon, Fisher, Spivak, McClelland & Maier

[57] ABSTRACT

Disclosed is a fire-tested butterfly valve having a resilient flexible seat member held in place in a valve housing by being clamped between cooperating surfaces of the valve housing and a valve seat retaining ring insert. Also positioned between the housing and the insert is a fusible washer means which has a lower destruction temperature than that of the annular flexible seat. Further, the insert is spring biased toward the fusible washer and valve housing so that when the valve is exposed to fire the fusible washer melts, the insert is biased toward the housing, and as the annular flexible seat is destroyed by heat, an edge of the insert into contact with the butterfly disc to establish a secondary, metal-to-metal, fire resistant seal.

6 Claims, 2 Drawing Figures

FIRE SAFE BUTTERFLY VALVE

CROSS-REFERENCE TO RELATED APPLICATIONS

This application is related to the commonly assigned patent application entitled "Fire-Tested Butterfly Valve" by Tadashi Aoki et al, filed this same day having Serial No. 866,814, still pending.

BACKGROUND OF THE INVENTION

This invention relates to rotary fluid control valves of the butterfly valve type. These valves have a circular fluid flow channel therethrough and a circular disc mounted for rotation between an open position, in which the disc lies substantially parallel to the axis of the fluid flow channel through the valve, and a closed position in which the disc lies perpendicular to this axis. Conventionally, the disc edge contacts a relatively soft or resilient annular seat circumscribing the fluid flow channel when the valve is in the closed position, and the sealing contact between these members will shut off fluid flow through the channel.

Valves of the type just described have not commonly been used in certain applications requiring fire-tested valves. Briefly stated, fire-tested valves are valves that must function as conventional valves in general service, but which must be able to survive exposure to a fire occuring in their environment. Many older, conventional valve types such as gate valves, globe valves and plug valves are metal-to-metal seated, and thus are assumed to be fire resistant. Soft-seated valves, on the other hand, must be certified fire-tested because of several industrial fires several decades ago which were eventually attributed to leakage from rubber or soft-seated valves during a "small" fire, which thus spread out of control when fed by that leakage. Thus, as is apparent, fire-tested valves are often used in flammable fluid service. One of the basic requirements for a fire-tested valve is that there be no loss of performance attributable to the safety feature. Since normally a fire does not occur during the life of the valve, it is expected to function just as a conventional valve would, with equivalent pressure and temperature ratings and cycle life. But, it is also expected to seal within standardized limits after a fire. Several examples of industry standards for fire testing are: American Petroleum Institute (Division of Refining) Standard 607 for Fire Test For Soft Seated Ball Valves; American Petroleum Institute (Division of Production) Standard for Fire Test For API SPEC 6A and 6D Valves; and Oil Companies Materials Association Specification No. FSV. 1, Fire Safe Test For Soft Seat Ball Valves. As is apparent from the titles of these specifications, the most common fire-tested soft seated valves are the ball valve type.

A further desirable feature in butterfly valves is the ability to shut off liquid flow coming from either side of the disc. Many existing butterfly valves are unidirectional, i.e., only one side of the valve may face the upstream side of the flow line if sealing efficiency is to be maintained. It is, of course, desirable for the valve to be capable of shutting off and controlling fluid flow regardless of the direction from which the fluid pressure is applied to the valve.

Still a further desirable feature in butterfly valves is the ability to enhance the sealing effectiveness of the valve by means of the pressure exerted against the seat by the fluid being controlled. Many existing butterfly valves have seat configurations that cannot take advantage of the forces generated by the line pressure when the valve is closed.

It is an object of the present invention to provide a butterfly valve suitable for service with flammable liquids that may be certified as a fire-tested valve, yet provide a simple structure with improved sealing characteristics.

It is another object of the present invention to provide a butterfly valve with the aforementioned fire-tested feature and also to be capable of shutting off and controlling fluid flow regardless of the direction from which fluid pressure is applied to the valve.

It is a further object of the present invention to provide a butterfly valve with a fire-tested feature, an ability to control fluid flow regardless of its direction, and also to enhance the sealing effectiveness of the valve by means of the line pressure, at least as it bears against the resilient seat.

Other objects will be apparent from a consideration of this disclosure.

SUMMARY OF THE INVENTION

The butterfly valve of this invention is of a type wherein the butterfly disc element is mounted on a shaft for rotation about an axis perpendicular to the axis of the fluid flow channel. The butterfly disc has a flange extending from one planar surface thereof, and the shaft passes through and is attached to this flange so that the disc edge will form an unbroken sealing surface circumscribing the entire circumference of the disc.

The annular seat member circumscribes the fluid flow channel and is located so that it will cooperate with the disc sealing surface when the valve disc is closed. An interference fit exists between them.

A ring-like insert member is provided so that the valve housing and the insert cooperate to form a groove into which the annular seat member fits. The insert itself is spring biased toward the housing by means of a plurality of bolts screwed into threaded holes in the housing but which have a series of Belleville spring washers around a smooth portion of each bolt shaft, said washer bearing on the head of the bolt at one end and the insert at the other end.

A fusible washer is normally positioned in a groove formed between the housing and the insert, but at a location radially outwardly of the groove holding the annular seat member. The fusible washer is formed of a material with a lower destruction temperature than the material of the annular seat so that exposure of the valve to fire will first result in the destruction of the fusible washer and then result in the destruction of the annular seat.

When the fusible washer is destroyed, the insert is still in contact with the annular seat member, but as this seat member decomposes to destruction, the Belleville springs tend to displace the insert toward the housing. One of the edges of the insert is radially positioned such that it will come into contact with the disc edge as the insert moves toward the housing. Since both the disc and the insert are metal, a metal-to-metal secondary seat is established at the point of contact which will maintain integrity despite exposure to fire.

As a further feature of the valve of the present invention, the resilient seat is constructed consistent with the teachings of commonly assigned U.S. Pat. No. 3,608,861 so that line pressure from either direction enhances the sealing effectiveness between the disc and seat.

Further features of the invention will be apparent from a consideration of the detailed description of a preferred embodiment of the butterfly valve and a consideration of the accompanying drawing.

DESCRIPTION OF A PREFERRED EMBODIMENT

Figure 1:
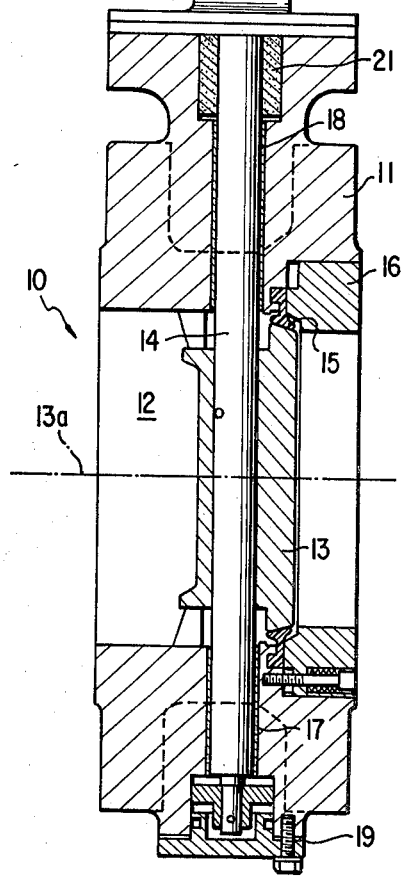
FIG. 1 is an elevation view, partially in cross-section, of a butterfly valve of the type disclosed as this invention.

Depicted in FIG. 1 is a valve 10 having a housing 11 defining flow channel 12 of circular cross-section therethrough, butterfly disc 13 mounted for rotation with shaft 14, annular flexible seat 15 and seat retainer ring 16.

The fluid flow channel 12 has an imaginary flow axis indicated at 13a. Shaft 14 is essentially perpendicular to flow axis 13a. The shaft is mounted for rotation in valve housing 11 with the aid of lower bearing means 17 and upper bearing means 18. Lower shaft plug means 19, not described in detail, is inserted in the bottom of the shaft bore to prevent the escape of internal fluid pressure.

Shaft seal 21 prevents the escape of internal fluid pressure at the top of valve 10. Actuator 22, not shown in detail, is employed to rotate the valve between open and closed position.

Figure 2:
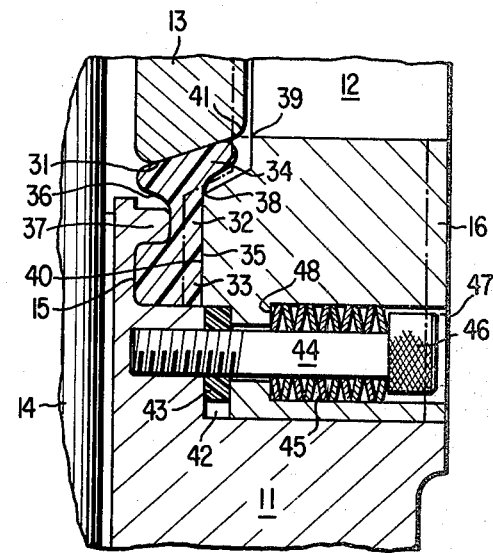
FIG. 2 is a cross-sectional view of the zone of cooperation between the annular seat, the insert, and the sealing surface of the disc of the valve of the instant invention.

FIG. 2 shows, in enlargement, that portion of the valve in which the cooperation between the disc 13 and flexible annular seat 15 must occur.

Seat 15 has an inclined lip portion 34 configured to sealingly cooperate with disc sealing surface 31. Annular seat 15 further includes a narrowed linking portion 32 that connects lip portion 34 with heel portion 33. A groove is formed in the housing between surface 40 of insert 16 and a facing surface of the valve housing 11. This groove confines heel 33 and a portion of linking portion 32 of seat 15. Valve housing fulcrum 37 cooperates with seat groove 36 to insure that the seat is locked in its groove.

The radial spacing of valve housing fulcrum 37 and valve insert fulcrum 38 are controlled in the manner disclosed in commonly assigned U.S. Pat. No. 3,608,861 to ensure that the line pressure may be employed to enhance the disc and seat sealing effectiveness regardless of the direction from which pressure is applied. Briefly described, when the valve is closed and when pressure is from the right side of FIG. 2, the disc 13 is designed to displace a given amount to the left. Lips 34 of seat 15 will tend to displace a greater amount to the left since it is relatively free to flex about fulcrum 37. The pressure in the line thus enhances the already existing interference fit between the disc and seat. When pressure is applied from the left side of FIG. 2, the displacement of disc 13, although to the right, is essentially of the same magnitude as the disc displacement was to the left, but lip 34 of seat 15 tends to displace less than the displacement of the disc. This is due to the radial placement of fulcrum 38 which is radially inward of fulcrum 37. Fulcrum 38 restrains a greater portion of linking portion 32 of seat 15 than does fulcrum 37, with an attendant greater resistance to flexure. Once again, the pressure in the line enhances the already existing interference fit between the disc and seat.

Surface 40 of insert 16 is normally in sealing contact with surface 35 of seat 15 under the influence of spring biasing means. Belleville springs 45 surround a smooth-shanked portion of bolt 44 and bear at one end against bolt head 46 and at the other end against blind shoulder 48 of bolt hole 47. A plurality, for example, eight, of these bolt and spring structures are spaced around insert 16.

An annular fusible washer 43 is disposed in groove 42, said groove 42 being radially outwardly of the groove holding seat 15. The thickness of washer 43, for reasons to be described later, should be the same or preferably slightly larger than the distance between points 39 and 41 on insert 16 and disc 13, respectively. The threaded portion of bolt 44 passes through a hole in washer 43 and engages a mating hole in valve body 11.

Under normal service, the plurality of Belleville spring sets 45 bias insert 16 into both washer 43 and seat 15. Upon exposure to a fire, and since the destruction temperature of fusible washer 43 is lower than the destruction temperature of annular flexible seat 15, washer 43 melts and is eventually destroyed. Insert 16 is then restrained from movement toward valve body 11 but as seat 15 is itself destroyed by fire, insert 16 moves further to the left in FIG. 2. Sharp edge 39 of insert 16 then comes into line contact at 41 on sealing edge 31 of disc 13, establishing a secondary, metal-to-metal, fire resistant seal.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A butterfly valve comprising a housing defining a fluid flow channel, a shaft, a butterfly valve disc mounted on said shaft for rotation within said channel to control fluid flow therethrough, an annular resilient seat member circumscribing said channel to sealingly cooperate with the edge of said disc when said disc is perpendicular to said channel, a metal insert ring abutting said resilient seat and configured to provide a fulcrum against one side of said resilient seat, means for biasing said insert ring in sealing contact with said resilient seat, and fusible means positioned relative to said insert ring and spaced from said resilient seat to resist said biasing and hold the insert ring away from the valve disc to normally prevent metal-to-metal wear therebetween until exposure of the valve to fire destroys said fusible means, thereby permitting said insert ring to be biased toward said edge of said disc and contact same with secondary sealing means thereon to establish a metal-to-metal fire resistant seal.

2. The butterfly valve of claim 1, wherein said secondary sealing means comprises an edge on said insert ring which contacts said edge of said disc after destruction of said fusible means and said resilient seat.

3. The buttefly valve of claim 1 wherein the destruction temperature of said fusible means is less than the destruction temperature of said resilient seat.

4. A butterfly valve as set forth in claim 1, wherein said insert ring and said housing form a first and second groove with said second groove being positioned radially outwardly of said first groove and wherein said resilient member is positioned in said first groove and said fusible means is positioned in said second groove.

5. A butterfly valve comprising a housing defining a fluid flow channel, a shaft, a butterfly valve disc mounted on said shaft for rotation within said channel to control fluid flow therethrough, an annualar resilient seat member circumscribing said channel to sealingly cooperate with the edge of said disc when said disc is perpendicular to said channel, a metal insert ring abutting said resilient seat member, means for biasing said insert ring in sealing contact with said resilient seat member, and fusible means positioned relative to said insert ring to resist said biasing to hold the insert ring spaced away from the valve disc and prevent metal-to-metal wear therebetween during normal use and until exposure of the valve to fire destroys said fusible means, thereby permitting said insert ring to be biased toward said edge of said disc and contact same with secondary sealing means thereon to establish a metal-to-metal fire resistant seal, the space between the insert ring and valve disc during normal use being such that upon the occurrence of a fire the insert ring abuts the valve disc while the insert ring is still positioned for continued movement relative to the housing, wherein said means for biasing comprises a plurality of sets of Belleville washers bearing against said insert ring and a corresponding plurality of fastening means attaching said insert to said housing.

6. A butterfly valve comprising a housing defining a fluid flow channel, a shaft, a butterfly valve disc mounted on said shaft for rotation within said channel to control fluid flow therethrough, an annular resilient seat member circumscribing said channel to sealingly cooperate with the edge of said disc when said disc is perpendicular to said channel, a metal insert ring abutting said resilient seat member, means for biasing said insert ring in sealing contact with said resilient seat, and fusible means positioned relative to said insert ring to resist said biasing to hold the insert ring spaced away from the valve disc and prevent metal-to-metal wear therebetween until exposure of the valve to fire destroys said fusible means, thereby permitting said insert ring to be biased toward said edge of said disc and contact same with secondary sealing means thereon to establish a metal-to-metal fire resistant seal, the space between the insert ring and valve disc being such that the insert ring abuts the valve disc while the insert ring is positioned for continued movement relative to the housing, wherein said housing has a protrusion forming a first fulcrum bearing against one side of said resilient seat, and means on said insert ring acts as a second fulcrum bearing against the other side of said resilient seat, the radial spacing of said fulcrums being such that they constitute means to enhance the sealing effectiveness of the valve with line pressure regardless of the direction of fluid flow through the valve.

* * * * *